Oct. 28, 1952 W. S. ROUVEROL 2,615,708
SPRING SUPPORT

Filed June 2, 1951 4 Sheets-Sheet 1

INVENTOR.
William S. Rouverol
BY
Harry Dexter Reed
ATTORNEY

Oct. 28, 1952 W. S. ROUVEROL 2,615,708
SPRING SUPPORT
Filed June 2, 1951 4 Sheets-Sheet 2

INVENTOR.
William S. Rouverol
BY
Harry Dexter Peck
ATTORNEY

Oct. 28, 1952 — W. S. ROUVEROL — 2,615,708
SPRING SUPPORT
Filed June 2, 1951 — 4 Sheets-Sheet 3

INVENTOR.
William S. Rouverol
BY Harry Dexter Peck
ATTORNEY

Patented Oct. 28, 1952

2,615,708

UNITED STATES PATENT OFFICE 2,615,708

SPRING SUPPORT

William S. Rouverol, Oxford, England, assignor to Grinnell Corporation, Providence, R. I., a corporation of Delaware Application June 2, 1951, Serial No. 229,562

7 Claims. (Cl. 267—1)

This invention relates to improvements in spring supports. More especially it has to do with a support which utilizes one or more helically coiled springs and yet provides an absolutely constant supporting effect for a load subject to vertical movement.

Where gravitational force acts upon a load it always tends to pull the load downward and to offset this tendency the weight of the load must be balanced either by counterweights or a spring counterbalance.

Counterweights have the advantage of producing perfect static equilibrium at all positions of the load, but the great dead weight and rotational inertia have come to be considered undesirable in an increasing number of commercial items. Overhead garage doors, piping, automobile hoods and trunks, vertical drafting machines, etc., are typical examples of products now being balanced by springs rather than by counterweights, despite the fact that the prevailing method of spring loading provides only approximate balancing.

The simplest spring support consists merely of a helical compression or extension spring acting directly on the load. At only one position of the load does the supporting effect of such a spring truly equal the weight of the load. In any other position of the load it is either undersupported or oversupported due to the variation in the force exerted by the spring as it is deflected.

Other spring supports have been provided which involve one or more levers interposed between the load and one or more springs, but here again the supporting effect is not always constant. Such supports produce static equilibrium at some one, usually the means, position in the travel of the load. Some may provide equal support at one or two other positions of the load, but except at such few positions of balance there is a variable disparity between the supporting effect of the spring or springs and the weight of the load being supported. This inaccuracy in the support of the load has been accepted for the sake of simplicity and economy.

It is an object of the present invention to provide a spring support which will provide accurate counterbalancing in all vertical positions of a load whether the support is suspended from above or rests on a fixed base below. It is also an object to provide a device having a lever from which the load hangs and is truly counterbalanced even if the lever rotates through 360°. It is still another object to provide this absolute constant support without the aid of any booster or compensating springs. A further object is to so arrange the spring means and the leverage system of the device that only a minimum of headroom is required for its installation. It is a feature of the invention that the improved support is simple and rugged and has no excessive weight or bulkiness. Within the limits of its load range the support can be easily adjusted to accommodate different loads. Other objects and features or advantages of the invention will be appreciated as the description herein develops.

The best modes in which it has been contemplated applying the principles of the present invention are shown in the accompanying drawings but the latter are to be deemed merely illustrative because it is intended that the patent shall cover by suitable expression in the appended claims whatever features of patentable novelty exist in the invention disclosed.

Referring to the drawings, and particularly to Figs. 1 through 5, the improved spring support shown in these figures has a simple U-shaped frame 10 with a top plate 10a which can be secured to some fixed overhead structure by one or more tie rods 12. Depending side plates 10b extend vertically downward from the top plate. Since much of the structure of this support is symmetrical on both sides of the dot-and-dash center line c/l seen in Fig. 2, the corresponding parts will be referred to by the same reference numerals.

Figure 2:
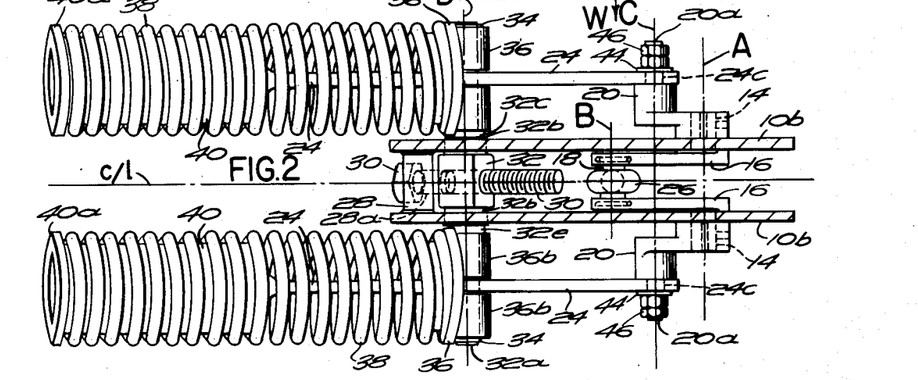
Fig. 2 is a plan in section on line 2—2 of Fig. 1.
Figure 3:
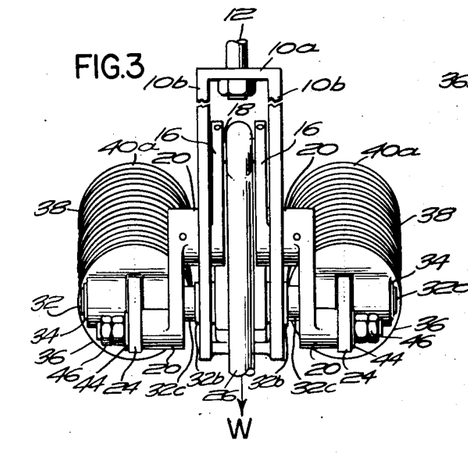
Fig. 3 is an end elevation as viewed from the right in Fig. 1.
Figures 4, 5:
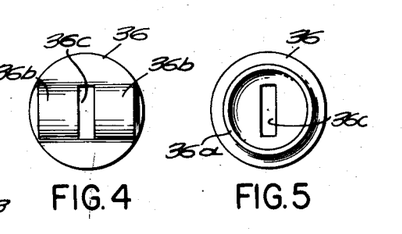
Fig. 4 is an elevation of one side of a spring end plate.
Fig. 5 is an elevation of the other side of the end plate.

The side plates 10b provide journals for a pair of stub shafts 14 having a common horizontal axis A. As here shown, each shaft has an integral crank 16 which rotates inside the side plates. The ends of these cranks are connected by another short shaft 18, preferably pinned to each crank, whose axis may be represented by the letter B. The stub shafts 14 project outside the side plates 10b and carry outside cranks 20, whose hubs are keyed to their respective shafts and may be further secured thereto by set screws. These cranks 20 have outstanding pins 20a for connection with links 24 to be presently described. The axes of the two pins 20a are in alignment and their common axis is designated by the letter C. A hanger rod 26 is pivotally mounted on the short shaft 18 between the inside cranks 16 and may be connected in any suitable manner to a load W which, as here indicated, hangs from the spring support.

Near the lower left end of the frame, as seen in Fig. 2, a strut 28 is secured between the side plates 10b, preferably by welding. This strut is large enough to have a hole 28a whose axis passes perpendicularly through the axis A. An adjusting stud 30 extends through this hole and screws into a rectangular block 32 from the opposite sides of which shafts 32a extend horizontally through slots 10c in the side plates. The common axis of these shafts is lettered D. Each shaft 32a has a relatively large cylindrical portion 32b which slides along the sides of its respective slot 10c when the adjusting stud 30 is turned and beyond this portion 32b has a somewhat smaller cylindrical portion 32c. Near the outer end of the latter portion is a circumferential groove to receive a resilient retaining ring 34.

On each shaft 32a is rotatably mounted an end plate 36 for a spring 38. The end plate 36 (see Figs. 4 and 5) has a raised circular wall 36a on one face which serves to center one end of a spring 38 and on the opposite face has a pair of outstanding separated bearings 36b which fit nicely about the shaft 32a. A central rectangular hole 36c is provided through the end plate in alignment with the space between the opposed sides of the bearings. The retaining ring 34 when snapped into the groove on the shaft 32a holds the end plate 36 from dislodgment.

The other end of the spring 38 rests against an external flange 40a of a cupped sleeve 40 which extends inside the spring a suitable distance and aids in keeping it from sagging between its ends. The bottom plate 40b of this sleeve is internally engaged by a nut 42 screwed onto a threaded cylindrical stem 24a at one end of the link 24. This link is otherwise preferably a flat bar having an elongated slot 24b through which the shaft 32a projects. The bifurcated portion of the link extends through the hole 36c in the end plate 36 and between the bearings 36b. At the end of the link, opposite the threaded stem 24a, is a hole 24c whose wall forms a bearing for the pin 20a on the crank 20, or if preferred, the slot 24b could be extended to include hole 24c. A washer 44 and nuts 46 hold the link rotatably on the crank pin 20a.

In what follows, throughout the entire text, the reference letters A, B, C and D refer to axes or pivots having the same general relation to one another.

From the description of the device thus far, it is clear that the several cranks 16 and 20 can be rotated through 360° and in any position of these cranks the hanger rod 26 will continue to be suspended from the short shaft 18. It is equally clear that if the load is assumed to be of constant magnitude and to hang vertically from the shaft 18 at all times, then in the clockwise direction of rotation, indicated by the curved arrow on Fig. 1, as the cranks 16 swing from top dead center to bottom dead center the load will tend to rotate those cranks in that same direction. Continuing the same rotative movement, as the cranks 16 swing from bottom dead center to top dead center the load tends to turn them counterclockwise. The problem then is to determine what effective spring forces acting on cranks 20, will exactly counterbalance the weight of the load throughout the entire 360° of rotation. The solution of this problem and the principle of operation of the improved device is perhaps best explained by first considering the general case of a counterbalanced body in static equilibrium.

Figures 6, 7, 8, 9:
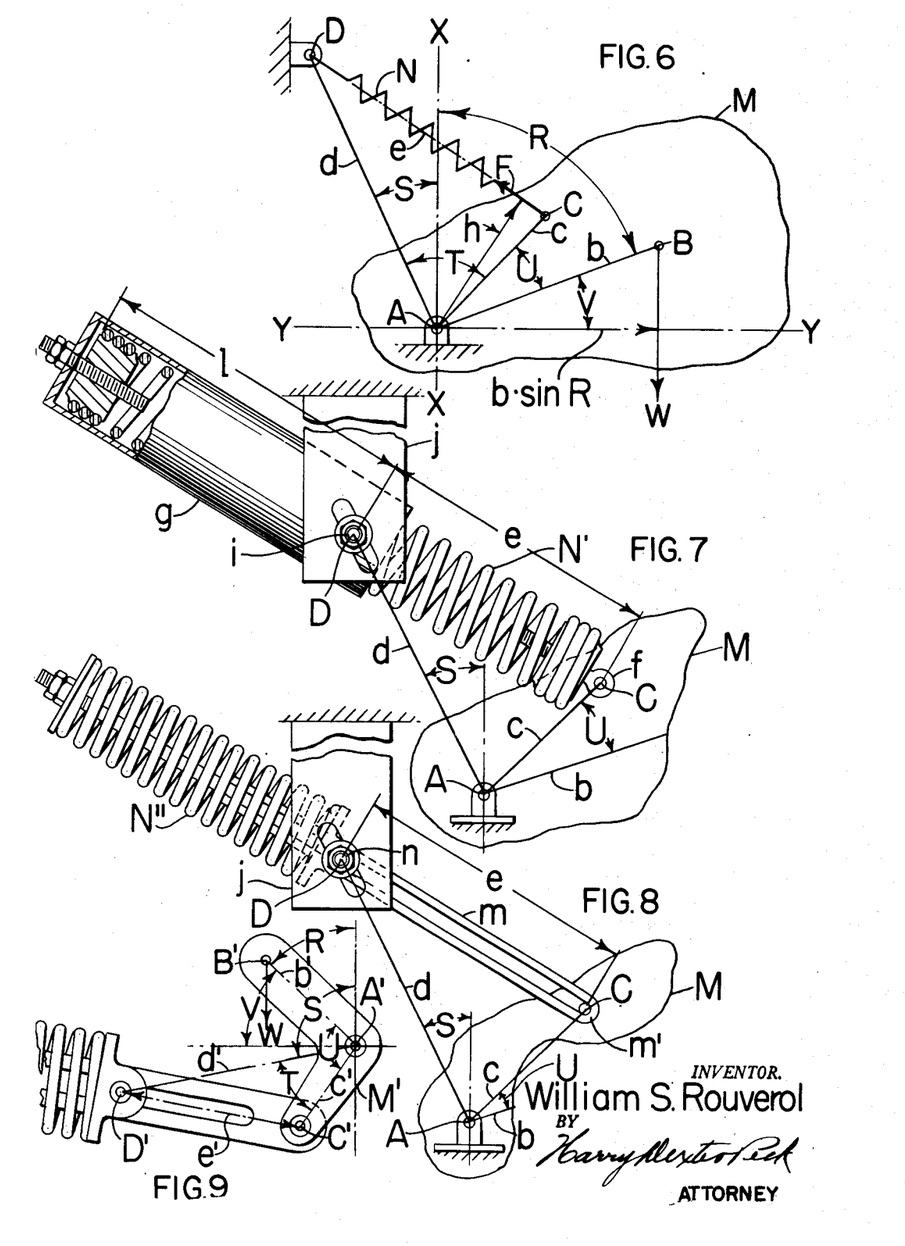
Fig. 6 is a diagrammatic showing of a counterbalanced body in static equilibrium.
Fig. 7 is a diagrammatic showing of an extension spring applied to the counterbalanced body.
Fig. 8 is another diagrammatic showing of a compression spring applied to the counterbalanced body.
Fig. 9 is a diagrammatic showing of a bell crank lever and spring means applied thereto.

Fig. 6 shows the outline of some mass or body M pivotally mounted on a fixed horizontal pivot A about which the body tends to rotate in a vertical plane. This tendency may be caused by a load W of constant magnitude and direction applied at point B, as for example the weight of the body itself in which case the point B would be the center of gravity. To balance the tendency of this load to cause clockwise rotation, assume that some form of spring means N is attached to the load at some point C and to a fixed anchor at some point D, the exact or proper locations of which points being for the moment unknown. Assume this spring exerts a force F in direction from point C toward point D. For perfect counterbalancing, the moment of this force F tending to cause counterclockwise rotation must be equal and opposite to the moment of the load W tending to cause clockwise rotation of the body. Knowing the weight W and the exact location of the center of gravity B, the question is how to determine the proper locations of the points C and D and the load-deflection characteristic or spring constant of the spring means N.

Draw the vertical axis line X—X and the horizontal axis line Y—Y intersecting at the pivot A. Draw the radial lines A—B, A—C, and A—D and the line C—D and label these lines b, c, d and e respectively. Also label the various angles formed by these lines as follows: Label the angle between the X—X axis and the line b as angle R; the angle between the line d and X—X axis as angle S; the angle between the line d and the line c as angle T; the angle between the lines c and b as angle U; and the angle between the line b and the Y—Y axis as angle V.

Since we have assumed the weight W to act vertically downward regardless of the rotative position of the body, its moment arm will always be the perpendicular distance between the pivot A and the vertical line B—W. This distance in terms of the angle R between the line $b$ and the X—X axis will be $b \times \sin R$; and therefore we can express the moment of the weight W as $W \times b \times \sin R$. If the moments of the load are plotted against the angle of rotation we shall obtain a true sine curve.

Having further assumed the force F of the spring to act in the direction from C toward D, along the line $e$, we can represent the moment arm by the line $h$ drawn from the pivot A perpendicular to the line $e$. This moment arm $h$ is not a fixed distance but changes as the body rotates and therefore it should also be expressed as the function of some angle. We know from the triangle ACD that the altitude $h$ is equal to the product of the two adjacent sides $c$ and $d$ and the included angle T divided by the third side. Thus we can express the moment arm of the spring force as $$h = \frac{c \times d \sin T}{e}$$

and write the moment of the spring force as $$F \times \frac{c \times d \times \sin T}{e}$$

If the spring force moments are plotted against the angle T we shall have another true sine curve. For perfect counterbalancing the sine curve of the load moments and the sine curve of the spring force moments should be equal and opposite, which means that the angles R and T must remain equal to one another as the body rotates about the pivot A. First, let us see how they can be made equal for the position of the body M shown in Fig. 6.

We can write the equilibrium equation of moments as follows:

(1) $$F \times \frac{c \times d \times \sin T}{e} = W \times b \times \sin R$$

From the lay-out of Fig. 6, it is clear that angle T is equal to the right angle between the X—X and Y—Y axes less the angles V and U, plus the angle S. Hence the sine of angle T is:

(2) $\quad \sin T = \sin (90° - V - U + S)$ or (3) $\quad \sin T = \sin [90° - (V + U - S)]$ But the sine of 90° minus an angle is the cosine of that angle whence:

(4) $\quad \sin T = \cos (V + U - S)$

Likewise the angle R is equal to the right angle between the X—X and Y—Y axes less the angle V. Hence the sine of angle R is:

(5) $\quad \sin R = \sin (90° - V)$ or (6) $\quad \sin R = \cos V$

Substituting in Equation 1 we can write:

(7) $$F \times \frac{c \times d \times \cos (V + U - S)}{e} = W \times b \times \cos V$$

From the foregoing equation it is clear that if we were to make angles U and S equal, they would cancel out and leave two equal cosines which in turn would drop out of the equation. Since at the outset we stated that both points C and D were "some" points, we can certainly locate them so that the line $c$ will be the same angular distance from line $b$ as the line $d$ is from the X—X axis and thus make angle U equal to angle S. If we do this it should be noted that we also make angles R and T equal, because $R + S = T + U$. Clearly if S and U are made equal it follows that R and T must be equal. Thus by making angles U and S equal we have equalized the two angles R and T whose sines determine the moment curves of the load and the spring force moments.

With angles U and S equal they drop out of Equation 7 and with them the two cosines can also be cancelled out leaving:

(8) $$F \times \frac{c \times d}{e} = W \times b$$

By making the angles U and S equal, we have determined the direction of the lines $c$ and $d$ and the next question is where on these lines are the points C and D?

Looking at Equation 8 again, let us transpose the terms as follows:

(9) $$F = \frac{W \times b}{c \times d} \times e$$

Since the four terms in the fraction are all constants, it follows that the force F required for perfect-counterbalancing is directly proportional to a linear distance $e$. Therefore a spring with a linear load deflection characteristic can be used provided the force it exerts is directly proportional to the distance between the points C and D. This requires that the distance between these points be at all times a direct measure of the total spring deflection.

The force of any spring is equal to its load-deflection characteristic or spring constant $k$ times its actual deflection. Hence in Equation 9 if $e$ is the actual deflection of the spring, then the fraction $$\frac{W \times b}{c \times d}$$

must represent the spring constant $k$. Hence the terms $c$ and $d$ can be so chosen that their product when divided into the product of $W \times b$ will give the desired spring constant. But in choosing the respective distances $c$ and $d$ we are determining the proper location of the points C and D on the lines A—C and D—C respectively.

Thus from the derivation of Equation 9 we have found these conditions must be satisfied; first, that the actual deflection of the spring must equal the distance $e$ between the points C and D; second, that the distances $c$ and $d$ must be such as to produce the proper spring constant $k$; and third, the angles S and U must be made equal.

The first requirement, that the distance $e$ between points C and D be equal to the actual spring deflection, prevents the use of any extension spring between the points C and D because then the distance $e$ would cover the spring connecting means as well as the free length of the spring. Obviously a compression spring could not be inserted between the points C and D because with the pivot D fixed in position the force of such a spring would be acting with the load W to cause clockwise rotation. In order that the distance between C and D shall be equal to the actual spring deflection the spring must be arranged as shown in Figs. 7 and 8.

In Fig. 7 only a portion of the outline of the body M, the pivot A and the lines $b$, $c$ and $d$, shown as in Fig. 6, are reproduced. The extension spring N' is connected at one end by suitable coupling means comprising an eye bolt $f$ to the point C and the other end of the spring is secured to the remote end of a cylinder $g$. This cylinder has suitable trunnions $i$ on its sides which can rotate in bearings provided by a pair of plates $j$. The axis of these bearings is located at the point D. When the spring is disengaged from the point C, the axis of the eye bolt $f$ will coincide with the point D and the spring will be fully relaxed or standing at its free length $l$. When the spring is elongated the distance the eye bolt $f$ moves away from the point D is the actual deflection of the spring and when connected to the point C this deflection is the distance $e$. If the body M is rotated about the pivot A the movement of point C will cause further elongation of the spring or a shortening thereof depending upon which direction the body is moved, but at any position reached by the point C the distance between it and the point D will be the actual deflection of the spring. During such movement of the point C the coils of the spring bearing against the inner wall of the cylinder will cause the latter to rotate about the trunnions $i$ and thus keep the line of action of the spring along the line through points C and D.

In Fig. 8, again only a portion of the outline of body M, the pivot A and the lines $b$, $c$ and $d$ are reproduced. Here a slotted rod $m$ has one end $m'$ connected to the point C, and extends on both sides of a shaft $n$ mounted between plates $j$ so that its axis passes through the point D. Between the shaft $n$ and the remote end of the rod is a compression spring N''. When the rod $m$ is disconnected from the point C and allowed to move so that its end $m'$ engages the shaft $n$, the spring N'' will have expanded to its free length.

When the end $m'$ of the rod $m$ is connected to the pivot C the spring will be deflected an amount equal to the distance $e$ between the points C and D. If the body M swings about the pivot A, the resulting movement of the point C will cause the spring N'' to be further compressed or extended depending upon which way the body swings. The rod will slide with respect to the shaft $n$ and although tilted from the position shown, its longitudinal axis will always pass through the point D so that the line of action of the spring will remain along the line C—D. Whatever change occurs in the distance between the points C and D will be the change in deflection of the spring.

Thus in Figs. 7 and 8 are shown diagrammatically how the conditions evolved from the diagrammatic showing of the counterbalanced body of Fig. 6 can be met with the use of either an expansion or compression spring.

Let us now see how these general principles and requirements of design as deduced from the counterbalanced body can be applied to a mechanical structure. For instance in Fig. 9 let the imaginary body be a bell crank lever M' rotatable about the horizontal pivot A' under the influence of a load W suspended from the point B' on one arm of the lever. How can a spring force be applied to this lever at point C' and produce exact counterbalancing of the load?

Starting with the load to be supported known and the physical dimensions of the bell crank, including the angle between its arms, also known, we can draw the bell crank in any position whatever, such as the one shown, where for convenience, the line $b'$ is 45° from the vertical axis. Since we know the angle U between the arms of the bell crank we can lay off the angle S from the vertical axis and draw the line $d'$. We know that the point D' must fall somewhere on this line $d'$, just where being dependent upon the characteristics of the spring it is desired to use. That is to say, if the spring is to have a small spring constant then the pivot D' will have to be much farther away from the pivot A than it would be if the spring has a large spring constant. To illustrate, assume the load to be supported is 1000# and that the distance $b'$ between the pivot A' and the point B' is 5'' and the distance $c'$ between the pivot A' and point C' is 4'', and suppose it is desired to use a spring having a spring constant of 125 pounds per inch of deflection. Looking at Equation 9 we know that $$k = \frac{W \times b'}{c' \times d'}$$

and substituting the known values thus, $$125 = \frac{1000 \times 5}{4d'}$$

we solve for $d'$ and find that point D' should be 10'' from the pivot A'. On the other hand, if the distance $d'$ is chosen arbitrarily, then the last mentioned equation would be solved for the spring constant that must be a characteristic of the spring to be used. With the location of the point D' established, it only remains to apply an extension spring as indicated in Fig. 7 or a compression spring as suggested in Fig. 8. In the several supports shown in Figs. 1–3, and 8–17 of the drawings, the springs disclosed are all compression springs.

Suppose that when the spring support is installed it is found that the load to be supported is somewhat less than anticipated. Within reason any such difference in load can be taken care of by moving the rectangular block 32 along the slots 10c in the frame. This is done by turning the adjusting stud 30, whose axis coincides with that of the hole 28a in the strut 28. It will be recalled that this axis passes through the pivot A. Hence in adjusting the block 32 what in effect is done is to move the point D toward or from the pivot A and thus change the distance $d$ until it satisfies the equation $$k = \frac{W \times b}{c \times d}$$

In the numerical example just given, where the load to be supported was assumed to be 1000#, and the hanger was factory adjusted with the point D or the axis of shafts 32a at a distance of 10'' from the pivot A, suppose when installed that the load actually applied to the support was only 800#. Substituting this new value in equation $$k = \frac{W \times b}{c \times d}$$

using the same spring with its spring constant of 125 pounds per inch of deflection as before, we now have $$125 = \frac{800 \times 5}{4 \times d}$$

and solving we find $d$ should now be equal to 8''. This means that the shafts 32a are moved 2'' toward the pivot A so that the distance between their axes and the pivot is 8''. The support will then perform to exactly counterbalance the load of 800#.

In the art of supporting piping a major consideration is the so-called head-room or extent of vertical space required for the supporting device itself. This is of especial importance where the support is to be used on a ship, because there the room available is usually small.

Not infrequently the frame of the supporting device is bolted directly to the underside of a deck so that the piping being supported may be as high up in the compartment as possible.

Usually with pipe hangers where the load is suspended from a rotatable lever it is not essential that the lever swing through 360°. Indeed, a lesser extent of swing is desirable, the most advantageous portion of the range of swing of the load arm being from approximately 45° above the horizontal to 45° below the horizontal. This range gives a relatively large percentage (about 71%) of the maximum vertical travel and only a relatively small percentage (about 15%) of the maximum horizontal movement of the hanger rod. Increasing the swing of the load arm to more than 45° above or below the horizontal increases the usually undesirable horizontal movement more than it increases the desirable vertical movement of the load.

The problem has been to devise a preferred form of practical structure in which the spring remains substantially horizontal when the load arm swings through the most desirable portion of its range. This form of structure is attained by the proper selection of the value of the equal angles of space S and U.

Looking again at Fig. 6, it would be possible to make the angles S and U both equal to zero, in which event the line $c$ would then coincide with the line $b$ and the line $d$ would fall on the X—X axis. The body would still be perfectly counterbalanced but the line $e$ would be much more inclined toward the vertical. Even if the springs were applied as indicated in Figs. 7 and 8 where angles S and U are relatively small it is clear that were the body to be rotated clockwise the cylinder $g$ and spring N' of Fig. 7, or the tie rod $m$ and the spring N'' of Fig. 8 would swing further upward toward the vertical about the point D from the positions shown. On the other hand in Fig. 6 the side $e$ could be made exactly horizontal by making the angles S and U somewhat larger than as shown. The further problem of deciding in which position of the load the spring should be exactly horizontal will depend on a number of factors but the important thing to note here is that the angles S and U are controlling and they must have some appreciable value in a device of practical dimensions before the spring will remain disposed in a generally horizontal position throughout the extent of its swing.

A preferred arrangement is that shown in Fig. 10 where the structure of Fig. 1 has been copied except that one of the side plates 10b has been cut away and stops 10d (shown in section) and 10e added to limit the swing of the lever so that only the most advantageous portion of the 360° range of swing of the load arm is permitted, that is the range of swing of the load arm from 45° above the horizontal to 45° below the horizontal.

Figure 10:
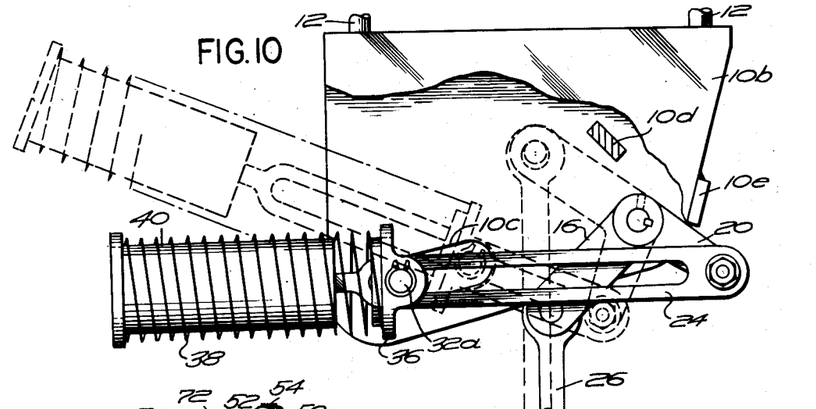
Fig. 10 is an elevation like Fig. 1, but with the swing of the lever limited to 90°.

The solid lines in Fig. 10 illustrate the positions of the parts when shafts 32a are located at the lower end of the slot 10c in the frame and the spring is at the lowermost position of its swing. The dotted outline shows the uppermost position of the spring when the shafts 32a are adjusted to the upper end of the slot 10c. These are the extreme positions which the spring can reach if the lever only swings through the most advantageous arc of travel.

It might appear that the best arrangement would be one in which the spring swings an equal number of degrees above and below the horizontal, which is not the case in Fig. 10, but since the top plate 10a of the frame 10 already defines the height of the device angles S and U were chosen to allow the spring to swing at least as high as this top plate. In that way the spring does not swing below the frame, the overall height of the device is minimized, and the limits of the spring movement are kept within the vertical extent of the frame 10.

Thus Fig. 10 clearly teaches that when angles S and U have a properly selected value then the spring will be substantially horizontal throughout the swing of the load arm in the most advantageous portion of its range.

Figures 11, 12, 13:
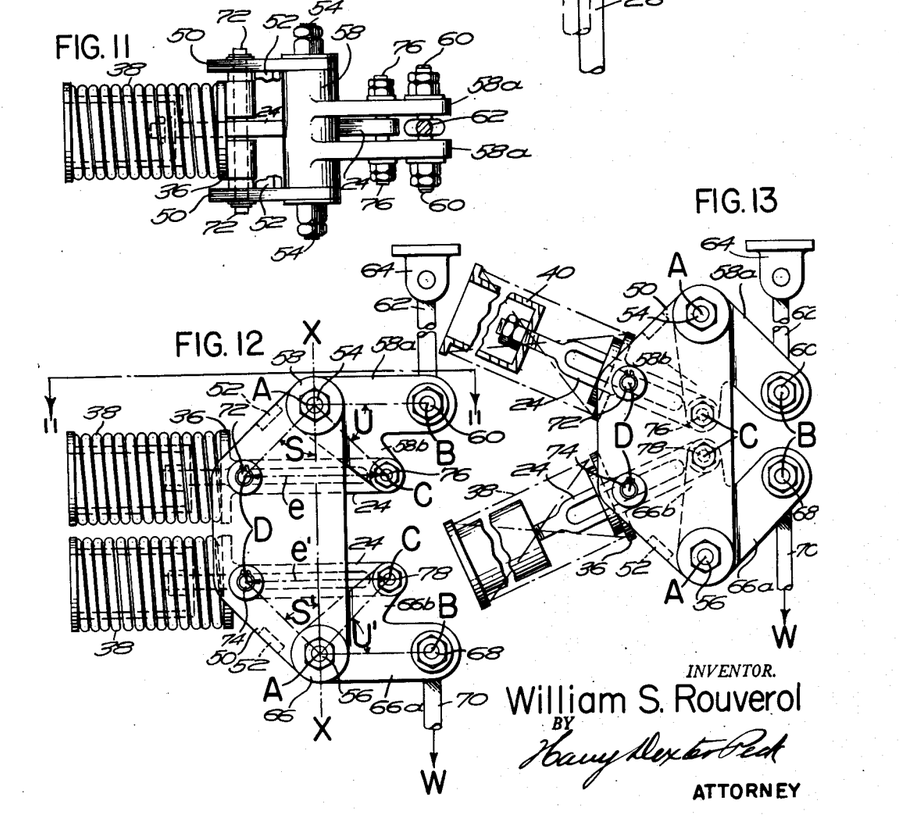
Fig. 11 is a plan of a modified spring support which provides for straight-line movement of a suspended load.
Fig. 12 is an elevation of the support of Fig. 11 showing the load in its lowermost position.
Fig. 13 is an elevation like Fig. 12 but showing the load moved upward.

Figs. 11 to 13 show another embodiment of the invention in a structure which, in addition to providing constant support, is so arranged that the point thereon from which the load is suspended moves only vertically and does not have the horizontal component of movement which, in some instances, may be a further improvement of the embodiments shown in the earlier figures.

Referring now to Fig. 12, the improved structure comprises a pair of vertically disposed floating plates 50 fastened together in parallel but separated relation by cross bars 52 whose ends are welded to the plates. These floating plates 50 serve to support the ends of two horizontal shafts 54 and 56 whose axes each correspond to the point A of Fig. 1 and on which are rotatably mounted between the plates 50 levers 58 and 66, respectively.

The bifurcated arms 58a of the upper lever 58 carry a shaft 60 which is connected by a tie rod 62 with some fixed overhead structure 64. The corresponding arms 66a of the lower lever 66 carry a similar shaft 68 from which the load W hangs by means of the rod 70. The axes of the shafts 60 and 68 correspond to the points B of Fig. 6, and the distances between the points A and B are equal for both levers.

Figure 1:
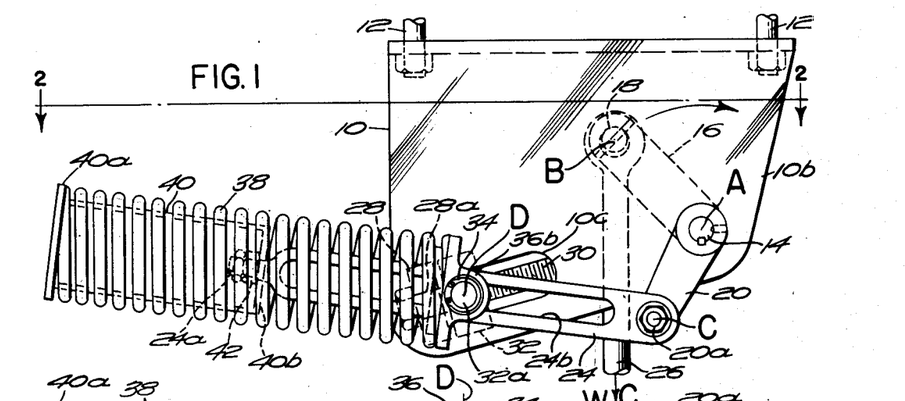
Fig. 1 is a side elevation of a spring support, embodying my invention, comprising a lever adapted to support a suspended load through a rotation of 360°.

The floating plates 50 also serve to support two additional shafts 72 and 74, the axes of which correspond to the point D of Fig. 1. On each shaft is mounted on an end plate 36 shown in Figs. 4 and 5 with springs 38 and link 24 applied as in Fig. 1. One link is pivotally connected to a shaft 76 carried by the bifurcated arm 58b of lever 58, and the other link is similarly connected to another shaft 78 carried by the bifurcated arm 66b of lever 66. The axes of these shafts 76 and 78 correspond to points C of Fig. 6, and the distances from points C and D are equal to one another. The upper spring 38 connected to lever 58 tends to rotate this lever clockwise about the shaft 54 while the lower spring 38 tends to rotate lever 66 counterclockwise about the shaft 56. Inasmuch as these two shafts are carried on the floating plate 50 what actually happens is that the lever 58 also rotates about the shaft 60 and thus moves the plate upward when the load moves upward from the position shown in Fig. 12. Since this also causes the shaft 56 to move upward, the combined result of this upward travel of the plate 50 and the rotation of lever 66 about shaft 56 results in a relative large movement of the shaft 68, rod 70 and load W upward.

In keeping with the principle of construction outlined earlier, angles S and U (see Fig. 12) measured about the axis of shaft 54 are equal. Likewise angles S' and U' measured about the axis of shaft 56 are equal, but in addition they are equal to angles S and U. Furthermore the distances $e$ and $e'$ which represent the deflection of springs 38 and 38 respectively are equal.

In the support of Fig. 1, as the cranks 16 rotate, there is both vertical and horizontal movements of the axis B where the load W or the weight of the piping is effective on the device. While the vertical movement of axis B corresponds to the vertical travel of the piping it does not follow that the horizontal movement of the point B will be the same as the displacement of the piping horizontally. As a practical matter, however, in many installations the piping is at a considerable distance from the axis B and even if the horizontal movement of the latter is different from the horizontal displacement of the piping, this difference is usually not so great that the departure of the hanger rod 26 from its assumed vertical position has any material influence on the constancy of the supporting effect.

Where it is necessary to install the spring support close by the piping, as for example on board a ship, and the piping is subject to horizontal as well as vertical travel then if the horizontal displacement of the pipe is sufficiently different from the horizontal movement of axis B so that the angular deflection of the hanger rod 26 would be appreciable, the desired accurate counterbalancing of the load might to some extent be disturbed. Under such conditions some form of connection (embodying rollers for example) between the hanger rod 26 and the piping is employed which will permit the piping to move horizontally without disturbing the vertical position of the hanger rod.

Where the load to be supported is subject only to vertical displacement, the embodiment of the support shown in Figs. 11–13 is particularly applicable because, as already stated, this provides constant support along a definite vertical line movement of the load. When the device is installed the lower end of the hanger rod 70 is connected to the load at a point vertically below the middle of the fixed shaft 60 which is carried by lever 58. The line of force of the load being vertical, and the lever arm 58 and 66 being parallel, as shown in Fig. 12, it follows that the middle of shaft 68 where the upper end of rod 70 is connected to lever 66 will also be vertically below the middle point of shaft 60. This is illustrated in Fig. 12 which shows the positions of the parts when the load is in its lowermost position. As the load moves upward from this position (see Fig. 13) its line of force is still a vertical line through the middle points of shaft 60 and the middle point of shaft 68 has moved upward to a new position on this same vertical line. The springs 38 share the load equally in all positions, consequently their deflections have changed equally, and the levers 58 and 60 have rotated the same amount so that the floating plates 50 remain vertically disposed.

Figs. 14 to 17 show still another embodiment of the invention in what may be called a base support upon which the load rests as distinguished from the supports shown in the previous figures where the load is suspended from the support. In this last to be described structure the travel of the load is solely vertical, as in the structure disclosed in Figs. 11 to 13.

Figure 14:
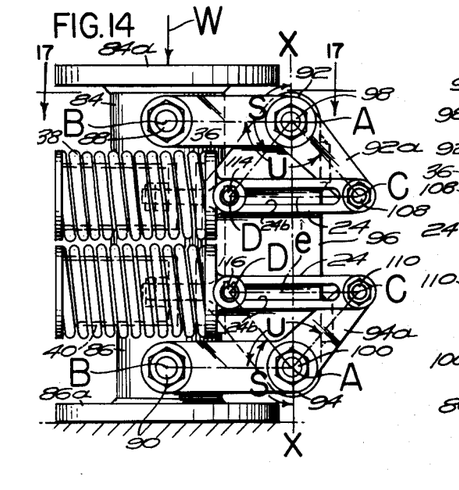
Fig. 14 is an elevation of another modified spring support which provides straight line movement of a load resting on the support.
Figure 15:
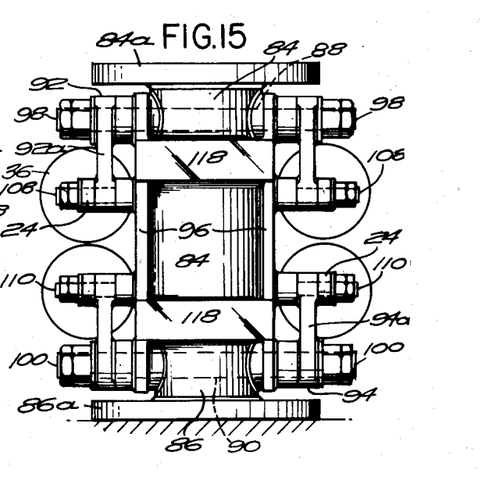
Fig. 15 is an elevation as viewed from the right in Fig. 14.

Referring now to Fig. 14 the base support comprises a pair of telescoping cylinders 84 and 86 whose axes are vertically aligned and which are provided at their remote ends with a top plate 84a and a bottom plate 86a respectively. The plate 86a rests upon some fixed base (as indicated) which may be the floor of a building and the load, represented by the arrows W in Figs. 14 and 16, rests upon the plate 84a. Fig. 14 shows the load in its lowermost position. As this load moves upward the cylinder 84 is guided in its vertical movement by the smaller cylinder 86 which fits nicely within it. Two short trunnions 88 are welded to the upper cylinder 84 on opposite sides thereof just below the top plate and extend horizontally. Likewise two similar trunnions 90 are welded to the lower cylinder 86 just above the bottom plate 86a, the trunnions on the same side being located in vertical alignment. The mechanism associated with the pair of trunnions on each side of the cylinders is identical with the mechanism associated with the pair of trunnions on the opposite side of the cylinders. Consequently the details and arrangement of the mechanism on both sides will be understood from a description of only one side of the support, the same reference numerals being applied to identical parts.

Pivotally mounted on the trunnions 88 and 90 are levers 92 and 94 respectively, which are separately, pivotally connected to a vertically disposed floating plate 96 by means of shafts 98 and 100. Although those shafts move vertically, as will presently appear, the axis of each one corresponds to the pivot A of Fig. 1 about which the levers swing. Likewise the axis of each trunnion 88 and 90 corresponds to the point B of Fig. 1. The arms 92a and 94a of each lever corresponds to the arms 20 of Fig. 1, and are connected respectively to shafts 108 and 110, whose arms correspond to point C of Fig. 1. Each arm 92a and 94a is connected to a link 24. These links, the springs 38, the end plates 36 and the sleeves 40 are duplicates of those shown in Fig. 1 and need not be further described here.

Two stub shafts 114 and 116 mounted on the floating plate 96 extend through the slots 24b and 24b of the links and serve as pivots about which the links and springs can rotate. The axis of each stub shaft 114 and 116 corresponds to the point D of Fig. 1. The equal angles S and U and the distance or deflection e are noted on Fig. 14. The floating plates on each side of the cylinders are preferably connected by cross bars 118.

Figures 16, 17:
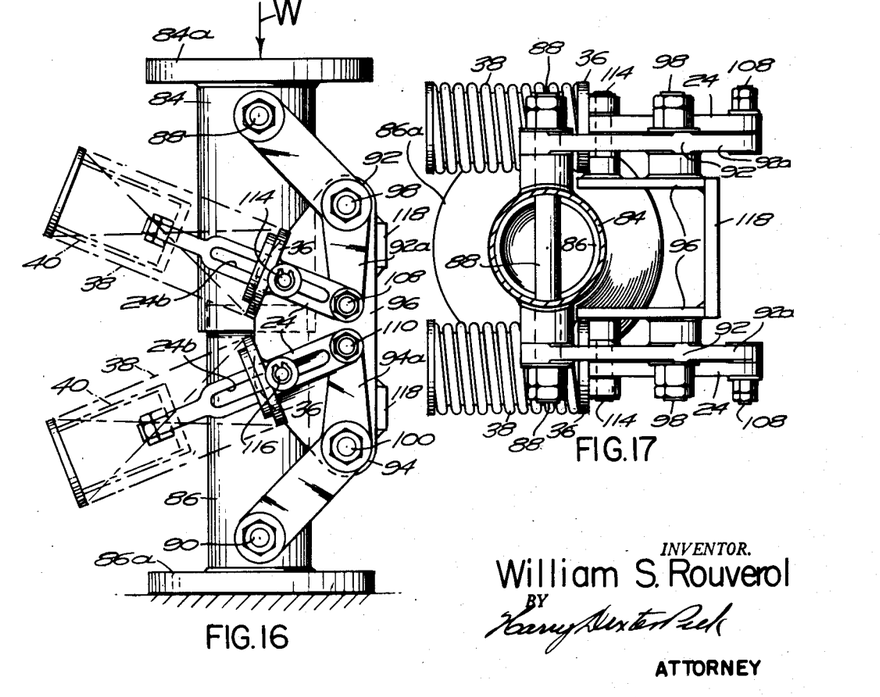
Fig. 16 is an elevation like Fig. 14 but showing the load moved upward.
Fig. 17 is a plan view of the support shown in Fig. 14.

Fig. 14 shows the position of the parts of the support when the load is at its lowermost position, and Fig. 16 shows the changed relation of the parts when the load has moved upward. In accordance with the general principle developed in connection with the counterbalanced body of Fig. 6 the supporting force of the springs exerted on the trunnions 88 and upper cylinder 84 will remain constant and exactly equal to the load, and the supporting force will continue to be exerted in the same vertical direction.

The embodiments of the invention herein disclosed provide absolutely constant support for a load whose weight remains unchanged but whose position may vary vertically. The improved device employs standard helical springs in such a way as to produce perfect equilibrium at all positions of the load within the range of movement for which the device is designed. The support is simple, rugged and inexpensive to construct, and its mode of operation may be embodied in various physical structures without departing from the principle involved.

I claim:

1. A spring support for exerting a constant supporting force on a load movable vertically within a limited range, which support comprises a frame, a lever pivoted thereon having arms angularly spaced apart about its pivot, means connecting the load to be supported to one arm of said lever so as to produce a turning moment about the lever pivot, oscillatable spring means mounted on a pivot on said frame, and means connecting one end of said spring means to a point on the other arm of said lever so as to produce a turning moment about the lever pivot equal to and opposed to the turning moment of the load; the distance between the axis of said spring pivot and the said point being equal to the deflection of the spring, and the said spring pivot lying on a line angularly spaced about the lever pivot from the vertical axis through the lever pivot by an amount equal to the angle between the said lever arms.

2. A spring support as defined in claim 1 in which the spring means pivotal mounting is adjustable along the said line toward or from the lever pivot.

3. A spring support for exerting a constant supporting force on a load movable vertically within a limited range which support comprises a frame, a lever pivoted on said frame having a pair of arms angularly spaced apart about the lever pivot, means connecting the load to be supported to one arm of said lever so as to produce a turning moment about the lever pivot which varies as the sine of the angle between said lever arm and the vertical axis through the lever pivot, oscillatable spring means pivotally mounted on said frame, and means connecting one end of said spring means to a point on the other arm of said lever so as to produce a turning moment about the lever pivot counterbalancing the turning moment produced by the load and which varies as the sine of the angle which said other arm makes with the line from the lever pivot to the spring pivot; the two above-mentioned angles being equal at any position of the load, the distance between the spring pivot and said point being always equal to the deflection of the spring means.

4. A spring support as defined in claim 3 in which the axis of the spring means is disposed in a substantially horizontal position when the load is midway of its limited range of movement.

5. A spring support for exerting a constant supporting force on a load movable vertically, which support comprises a frame, a lever pivotally mounted on said frame so as to be rotatable about a horizontal axis through 360°, means connecting the load to be supported to said lever so that the load hangs vertically therefrom at all rotative positions of the lever, and spring means pivotally mounted on said frame so as to oscillate about another horizontal axis and having one end pivotally connected to said lever; the said pivotal mounting on said spring being so located on the frame that the distance between its axis and the axis of pivotal connection of the spring means with the lever equals the deflection of the spring means throughout the entire rotative moment of the lever, the said spring means oscillating about its pivotal mounting as the lever rotates about its pivot and exerting a torque on said lever which is always equal and opposite to the torque exerted thereon by the load.

6. A spring support for exerting a constant supporting force on a load subject to vertical displacement which support comprises a movable frame, a lever pivoted thereon, said lever being pivotally connected to a fixed structure at a point on one of its arms, spring means having one end pivotally mounted on said movable frame, connecting means having one end secured to the other end of said spring means and having its other end pivotally connected to a point on a second arm of said lever, said connecting means being so arranged that the line of action of the spring force it transmits passes through the axis of the pivotal mounting of said spring means for any position of the said lever and being so arranged that the distance between the axis of the pivotal mounting of said spring means and the point on the second arm of said lever where one end of the connecting means is connected equals the deflection of said spring means for any position of said lever, said axis of the pivotal mounting of said spring means being located on a line angularly spaced about the pivot of said lever from the vertical therethrough by an angle equal to the angle between said arms, a second lever pivoted on said movable frame, means connecting the load to a point on one arm of said second lever, other spring means having one end pivotally mounted on said movable frame, connecting means having one end secured to one end of said other spring means and having its other end pivotally connected to a point on a second arm of said second lever, said connecting means being so arranged that the line of action of the spring force it transmits to said second lever passes through the axis of the pivotal mounting of said other spring means for any position of said second lever and being so arranged that the distance between the axis of the mounting of said other spring means and the point on the second arm of said second lever where one end of the connecting means is connected equals the deflection of said other spring means for any position of said second lever, said axis of the pivotal mounting of said other spring means being located on a line angularly spaced about the pivot of said second lever from the vertical by an amount equal to the angle between the arms of said second lever, the first said spring means and said other spring means acting on their respective levers to urge the point on the arm of said first mentioned lever where said lever is pivotally connected to a fixed structure and the point on the arm of said second mentioned lever where the load is connected toward one another along a vertical line.

7. A spring support for exerting a constant force on a load subject to vertical displacement which support comprises a movable frame member having two levers pivoted thereon, one of said levers having the load pivotally connected to one of its arms, and the other lever having its corresponding arm pivotally connected to a fixed base structure, spring means being pivotally mounted on said movable frame member, means connecting one end of said spring means to a point on a second arm of said first mentioned lever, the axis of the pivotal mounting of said spring means being located on a line angularly spaced about the pivot of the first mentioned lever from the vertical by an angle equal to the angle between the two arms of said first mentioned lever, said connecting means being so arranged that the line of the spring force always passes through said axis for any position of said first mentioned lever and being so arranged that the distance between said axis and the point on the arm of the first mentioned lever where the connecting means are connected equals the spring deflection for any position of the first mentioned lever, other spring means pivotally mounted on said movable frame member, means connecting one end of said other spring means to a point on a second arm of said second mentioned lever, the axis of the pivotal mounting of said other spring means being located on a line angularly spaced about the pivot of the second mentioned lever from the vertical by an angle equal to the angle between the two arms of said second mentioned lever, the last said connecting means being so arranged that the line of the spring force of said other spring means always passes through the axis of the pivotal mounting of said other spring means for any position of said second mentioned lever, and being so arranged that the distance between the last mentioned axis and the point on the arm of the second mentioned lever where the connecting means are connected equals the deflection of the said other spring means for any position of the second mentioned lever, said spring means and said other spring means acting on their respective levers so that the forces they exert thereon tend to urge apart the ends of the levers connected to the load and to the fixed based structure respectively, and means to guide the pivotal connection between the load and the first mentioned lever so that it can move only along a vertical line.

WILLIAM S. ROUVEROL.

REFERENCES CITED

The following references are of record in the file of this patent:

UNITED STATES PATENTS

| Number | Name | Date |
| --- | --- | --- |
| 1,671,365 | Hatch | May 29, 1928 |
| 1,816,164 | Wood | July 28, 1931 |
| 1,937,135 | Wood | Nov. 28, 1933 |
| 2,161,334 | Carwardine | June 6, 1939 |
| 2,480,864 | Loepsinger | Sept. 6, 1949 |
| 2,568,149 | Grabe | Sept. 18, 1951 |